United States Patent
Hui et al.

(10) Patent No.: US 8,908,536 B2
(45) Date of Patent: Dec. 9, 2014

(54) DENSITY-BASED POWER OUTAGE NOTIFICATION TRANSMISSION SCHEDULING IN FREQUENCY-HOPPING NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 13/631,452

(22) Filed: Sep. 28, 2012

(65) Prior Publication Data

US 2014/0092752 A1    Apr. 3, 2014

(51) Int. Cl.
*H04L 1/00*    (2006.01)
*H04L 12/18*    (2006.01)

(52) U.S. Cl.
CPC ...................................... *H04L 12/18* (2013.01)
USPC ......................................................... 370/242

(58) Field of Classification Search
USPC ......... 370/216, 241, 242–246, 252, 312, 328, 370/338, 390; 375/132–136; 340/870.11; 455/13.1; 709/223–227, 238–244; 714/748–750
See application file for complete search history.

(56) References Cited

U.S. PATENT DOCUMENTS

| | | | |
|---|---|---|---|
| 7,756,030 B2* | 7/2010 | Clave et al. | 370/230.1 |
| 8,059,011 B2* | 11/2011 | Van Wyk et al. | 340/870.11 |
| 2012/0151085 A1 | 6/2012 | Singh et al. | |
| 2012/0324273 A1 | 12/2012 | Shaffer et al. | |
| 2013/0028295 A1 | 1/2013 | Hui et al. | |
| 2013/0094536 A1 | 4/2013 | Hui et al. | |

OTHER PUBLICATIONS

Dutta, et al., "Wireless ACK Collisions Not Considered Harmful", HotNets-VII, Oct. 2008, 6 pages, Hot Topics in Networks, Calgary, Alberta, Canada.
Dutta, et al., "Wireless ACK Collisions Not Considered Harmful", HotNets-VII, Oct. 2008, 23 pages, Hot Topics in Networks, Calgary, Alberta, Canada.
Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Frank Duong
(74) *Attorney, Agent, or Firm* — Parker Ibrahim & Berg LLC; James M. Behmke; Kenneth J. Heywood

(57) ABSTRACT

In one embodiment, a node may discover the density of neighboring nodes in a frequency-hopping communication network. In response to identifying a power outage condition, the node may also dynamically determine an initial power outage notification (PON) transmission protocol based on the density of neighboring nodes. The node may then communicate a first PON to a plurality of neighboring nodes according to the initial PON transmission protocol.

20 Claims, 8 Drawing Sheets

DENSITY-BASED POWER OUTAGE NOTIFICATION TRANSMISSION SCHEDULING IN FREQUENCY-HOPPING NETWORKS

TECHNICAL FIELD

The present disclosure relates generally to shared media communication, and, more particularly, to power outage notification in frequency-hopping networks.

BACKGROUND

Mesh networks are composed of two or more electronic devices, each containing at least one transceiver. The electronic devices use their transceivers to communicate with one another and/or a central device. If the device wishes to communicate with another device that is out of transmission range, the device may communicate via multi-hop communication through other devices. In a frequency-hopping (or channel-hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time.

Channel schedules may be assigned to each transmitter-receiver pair independently so that neighboring transmitter-receiver pairs can communicate simultaneously on different channels. Such a strategy increases aggregate network capacity for unicast communication, but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Existing systems optimize for both unicast and broadcast communication by synchronizing the entire network to the same channel-switching schedule and using a central coordinator to compute and configure channel schedules for each individual device. However, this method adds significant delay and communication overhead to coordinate new schedules between each transmitter-receiver pair. Other systems provide a hybrid approach, where the communication is divided between independently schedule unicast schedules and a shared broadcast transmission schedule.

Because the devices may rely on a small source of stored energy (e.g., batteries or a capacitor) during a power outage of a main power supply, only a limited lifespan of the backup power (e.g., battery or capacitor) may be used to transmit information. In particular, the Advanced Metering Infrastructure (AMI) application requires devices to communicate a Power Outage Notification (PON) when main-power is no longer available. Certain residential meters today currently store enough energy to allow for 30 seconds of uptime and 3 packet transmissions. Since a device does not know what neighbors are affected by the power outage event, it broadcasts the PON three times within the 30-second window. However, because a large number of spatially correlated devices may be affected by a single power outage event, significant congestion can occur due to PON transmissions. Note also that in the hybrid channel-hopping scheme mentioned above, the congestion of PONs may be exacerbated by only allowing broadcast communication for a faction of time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a node may discover the density of neighboring nodes in a frequency-hopping communication network. In response to identifying a power outage condition, the node may also dynamically determine an initial power outage notification (PON) transmission protocol based on the density of neighboring nodes. The node may then communicate a first PON to a plurality of neighboring nodes according to the initial PON transmission protocol.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
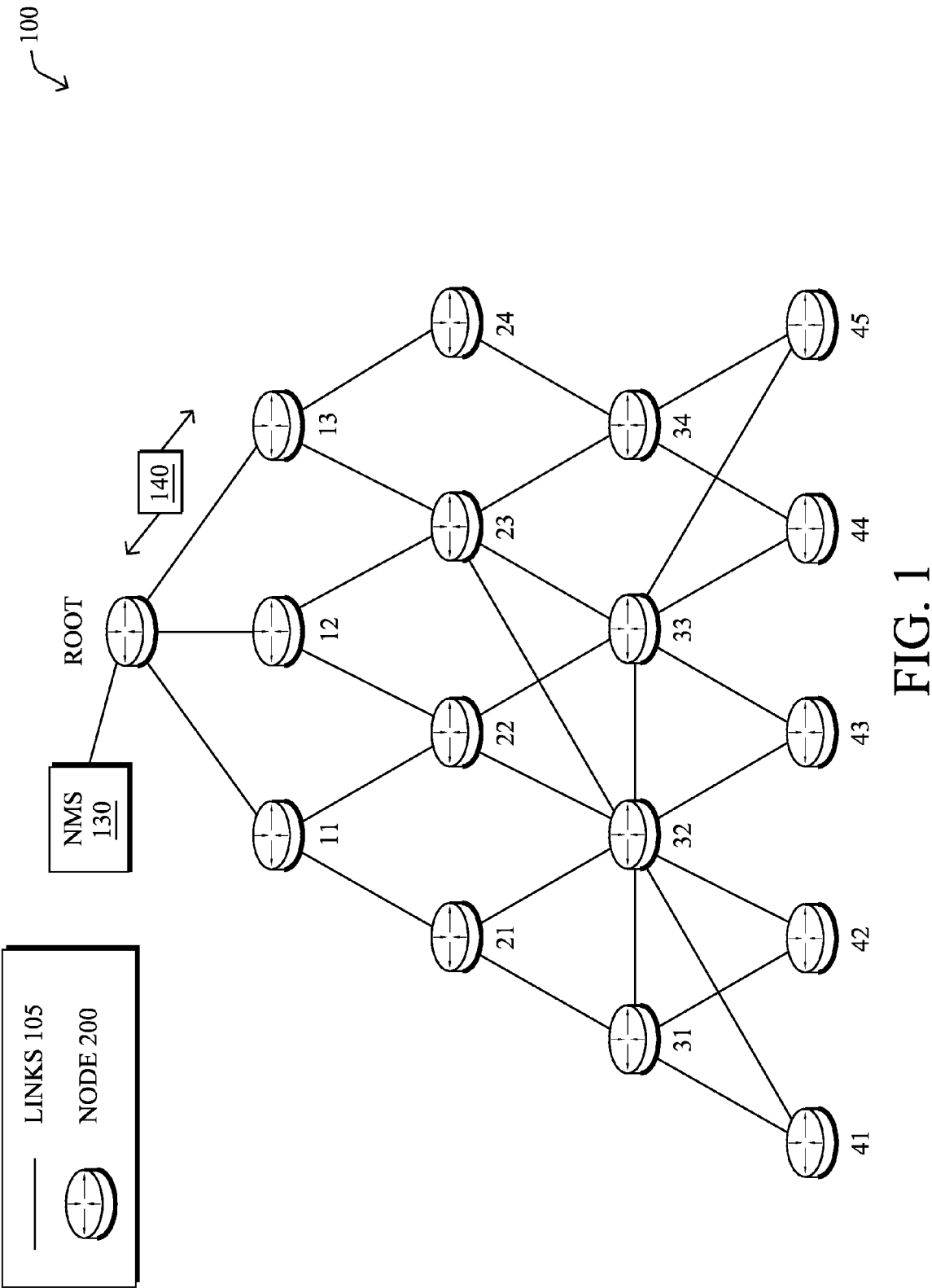
FIG. 1 illustrates an example communication network.

FIG. 1 is a schematic block diagram of an example computer network 100 illustratively comprising nodes/devices 200 (e.g., labeled as shown, "root," "11," "12," . . . "45") interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, or other head-end application device located beyond the root device (e.g., via a WAN), may also be in communication with the network 100.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
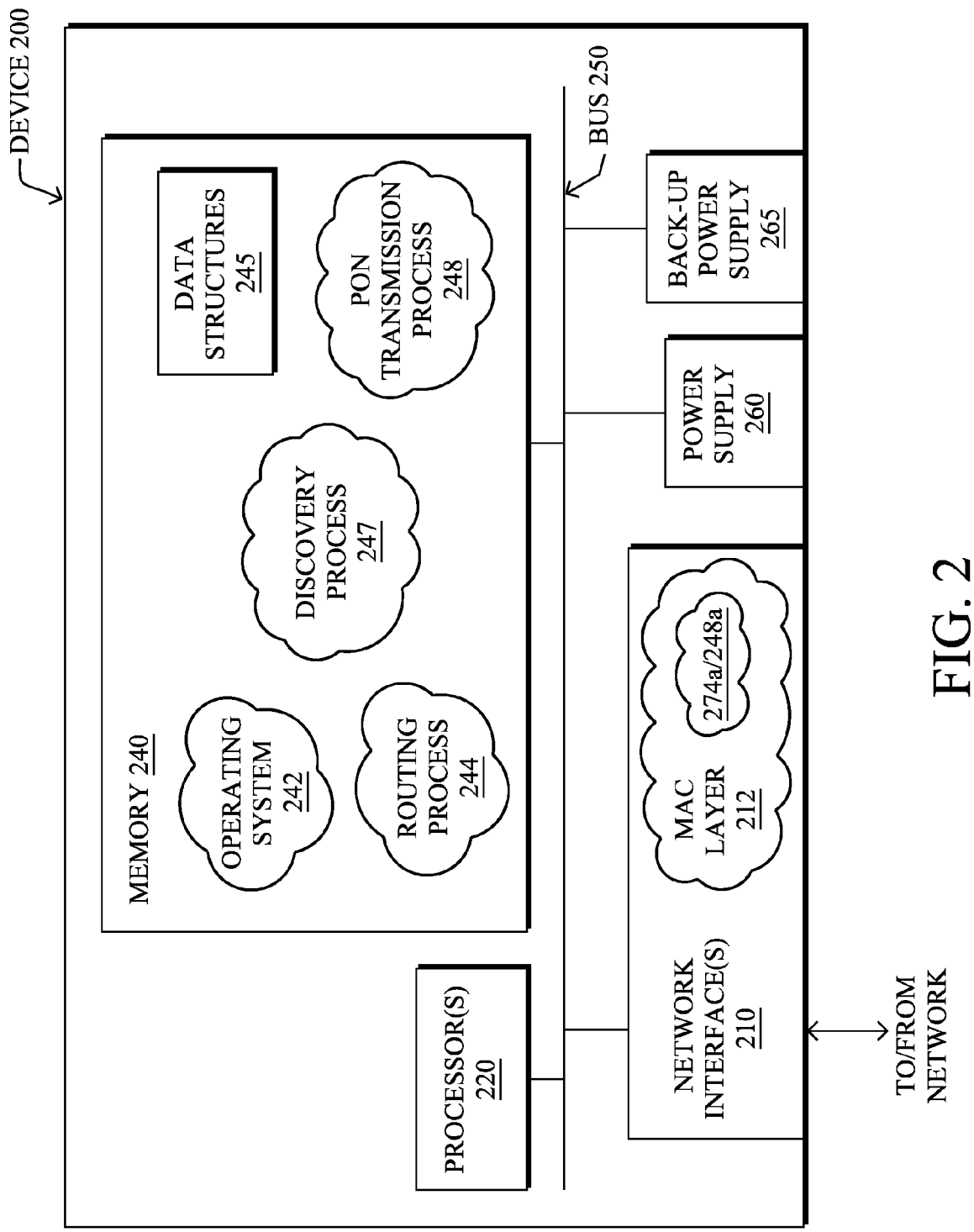
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, contain the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "discovery" process 247 and "PON transmission" process 248 as described in greater detail below. Note that while discovery process 247 and PON transmission process 248 are shown in centralized memory 240, alternative embodiments provide for either or both of the processes to be specifically operated within the network interfaces 210, such as a component of MAC layer 212 (process "247a/248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate is that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
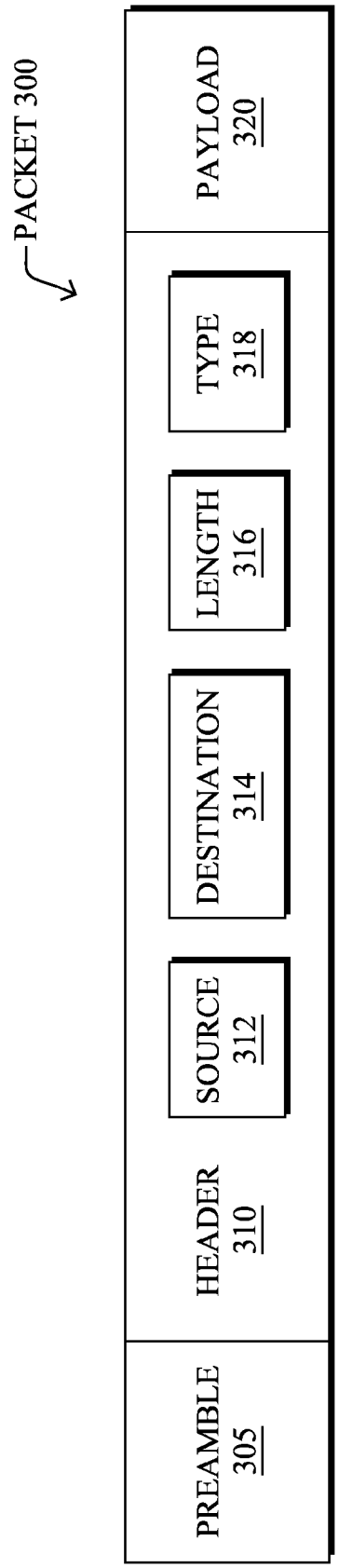
FIG. 3 illustrates an example wireless message/packet.

FIG. 3 illustrates an example simplified message/packet format 300 that may be used to communicate information between nodes 200 in the network. For example, message 300 illustratively comprises a header 310 with one or more fields such as a source address 312, a destination address 314, a length field 316, a type field 318, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 4A:
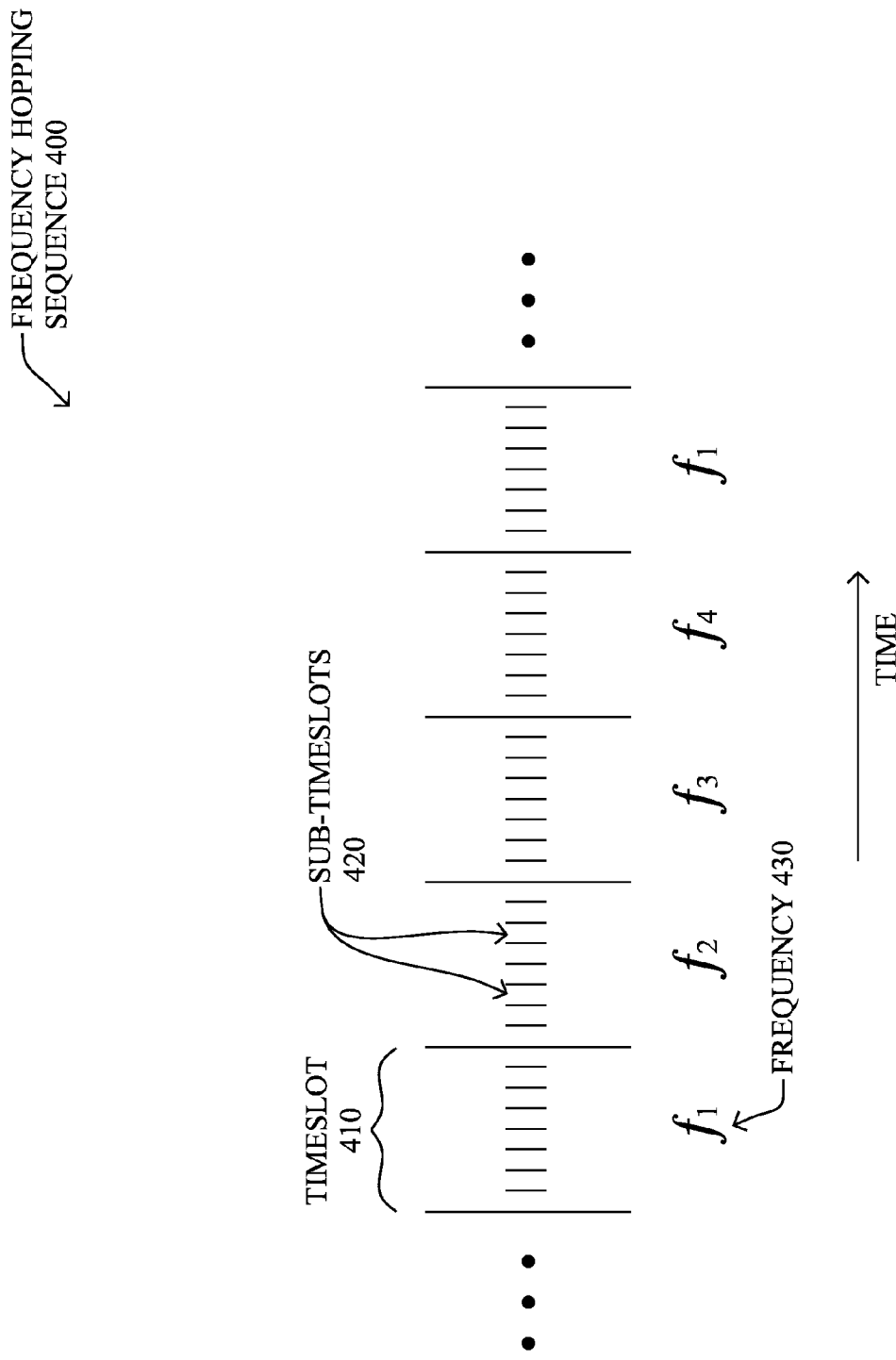
FIGS. 4A-4D illustrate example frequency hopping sequences.

In particular, as shown in FIG. 4A, in frequency-hopping wireless networks, time frames are divided within a frequency-hopping sequence 400 into regular timeslots 410, each one operating on a different frequency 430 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 410 may be further divided into sub-timeslots 420. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4B:
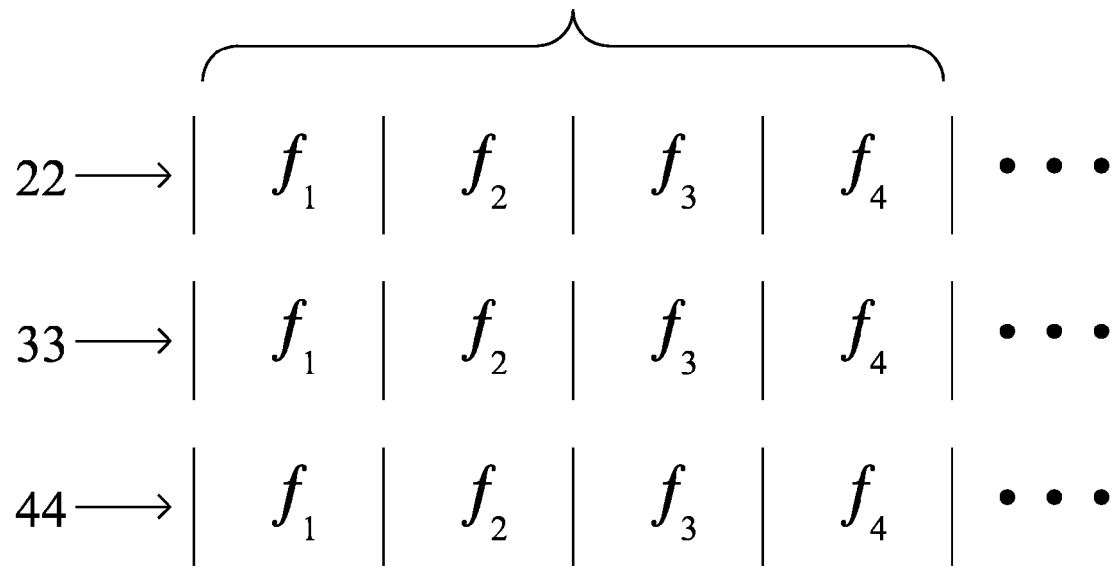

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4B, in which each receiver (e.g., 22, 33, and 44) may be configured with the same sequence (assume also that other nodes 200 within network 100 may use the same sequence).

Figure 4C:
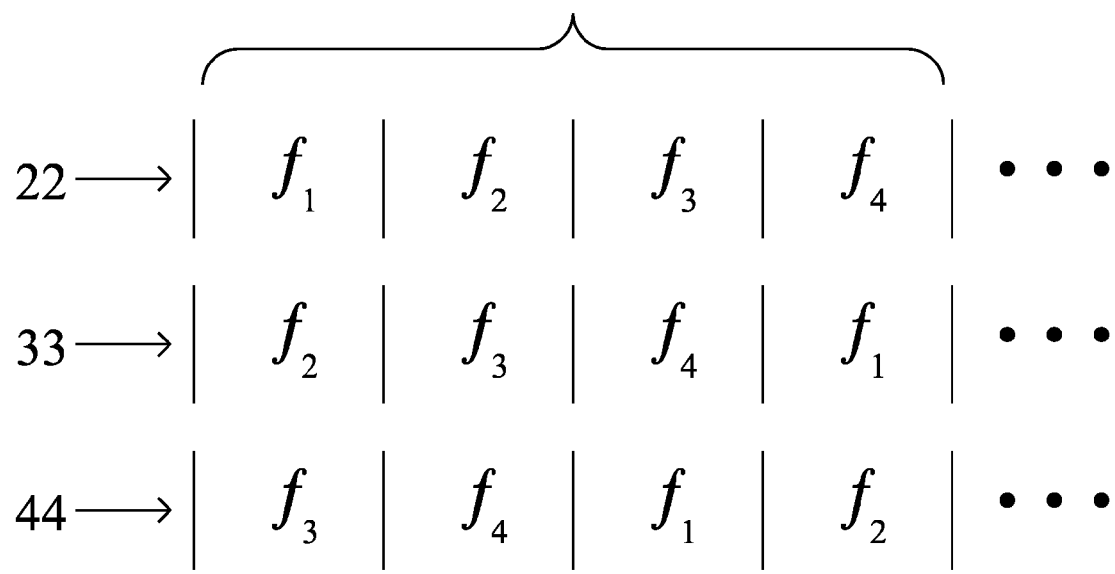

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4C. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Mesh networks typically utilize both unicast and broadcast communication. Applications use unicast communication to communicate data to a central server (e.g., AMI meter reads) or configure individual devices from a central server (e.g., AMI meter read schedules). Network control protocols use unicast communication to estimate the quality of a link (e.g., RSSI and ETX), request configuration information (e.g., DHCPv6), and propagate routing information (e.g., RPL DAO messages).

Applications use multicast communication for configuring entire groups efficiently (e.g., AMI meter configurations based on meter type), firmware download to upgrade (e.g., to upgrade AMI meter software to a newer version), and power outage notification. Network control protocols use multicast communication to discover neighbors (e.g., RPL DIO messages, DHCPv6 advertisements, and IPv6 Neighbor Solicitations) and disseminate routing information (e.g., RPL DIO messages).

Existing systems optimize for both unicast and broadcast communication by synchronizing the entire network to the same channel-switching schedule and using a central coordinator to compute and configure channel schedules for each individual device. For example, a first channel-hopping network may schedule all nodes to receive on the same channel at the same time, and the entire network hops together in lock-step. While this first network is optimized for broadcast, it does not allow frequency diversity for unicast where different pairs of nodes may communicate at the same time on different channels. In a second example network, both unicast and broadcast slots may be utilized, where a central gateway device computes the hopping schedule for each transmitter-receiver pair. However, this method adds significant delay and communication overhead to coordinate new schedules between each transmitter-receiver pair as the schedules are distributed using the wireless network. Each of these two example networks fail to optimize the schedule for both unicast and broadcast communication without the need for centrally computing schedules for individual nodes.

In an illustrative frequency-hopping network (e.g., a Connected Grid Mesh (CG-Mesh)) a frequency-hopping technique may be implemented in which each interface determines its own unicast receive schedule, and neighboring devices may synchronize with its unicast schedule to properly communicate a unicast frame. By having each device determine their own schedule independently, neighboring transmitter-receiver pairs may communicate simultaneously on different channels. This illustrative network also overlays a network-wide broadcast schedule, where all devices are synchronized to the same frequency-hopping schedule. For example, the broadcast schedule may only active for a fraction of the time (e.g., 25%), but may allow efficient broadcasts because a single transmission can reach an arbitrary number of neighbors. This hybrid approach allows this illustrative network (e.g., the CG-Mesh) to maximize spectral efficiency for unicast communication while also allowing efficient broadcast communication.

Figure 4D:
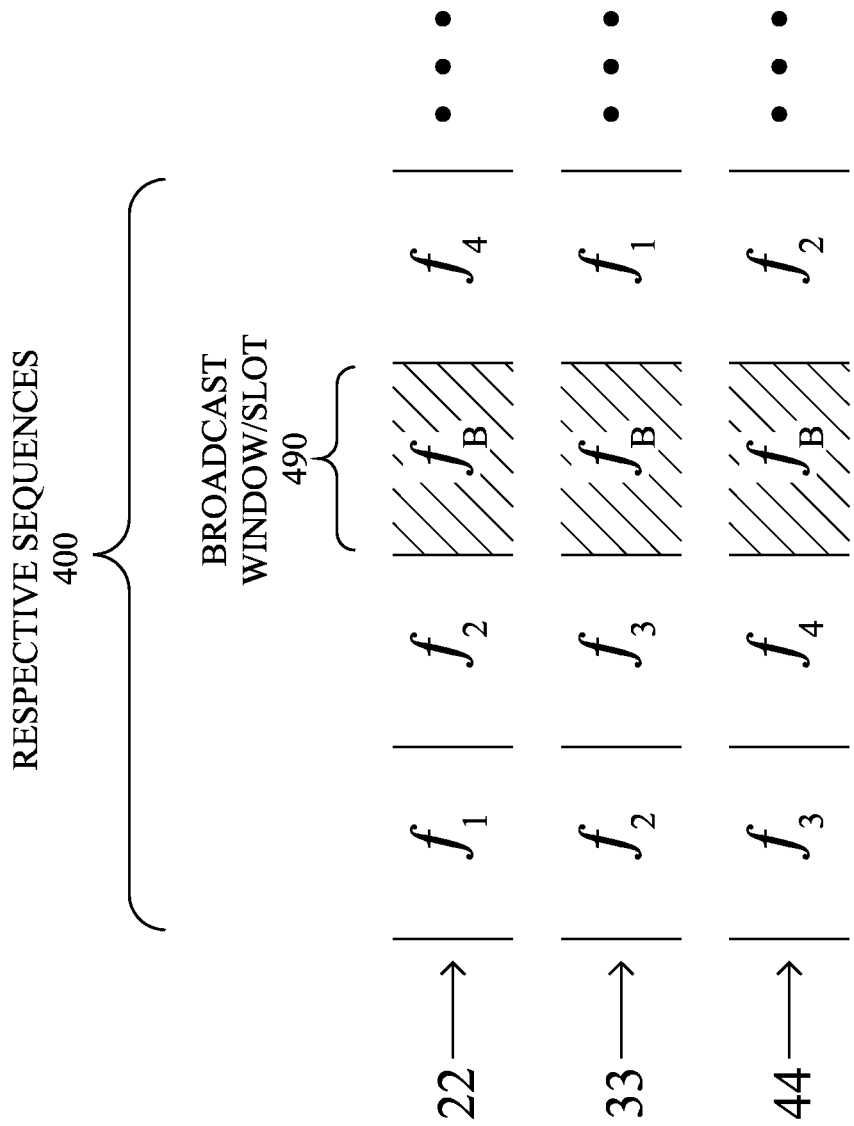

FIG. 4D illustrates an example of a broadcast slot/window 490 (e.g., $f_B$) overlaid within the frequency-hopping sequences of FIG. 4C above. Note that while the broadcast slot 490 is shown as aligning with the individual unicast timeslots, the broadcast timeslot need not match any unicast timeslot boundaries. Also, the unicast timeslot boundaries in FIGS. 4A-4D need not align between devices (e.g., between 22, 33, or 44), and the simplified view shown herein is merely for illustration.

Power Outage Notification (PON) is an important function in Smart Grid AMI networks. As noted above, because devices in a computer network (e.g., mesh network) may rely on a small source of stored energy (e.g., batteries or a capacitor) during a power outage of a main power supply, only a limited lifespan of the backup power (e.g., battery or capacitor) may be used to transmit information. In particular, the Advanced Metering Infrastructure (AMI) application requires devices to communicate a Power Outage Notification (PON) when main-power is no longer available. Specifically, for Smart Grid AMI applications, handling power outage scenarios reliably and effectively is a challenging problem. Existing mesh-networking solutions that support AMI applications provide some capability to report power outage events. For example, devices may broadcast a PON or "Last Gasp" message in hopes of communicating the event to a neighboring device that is still powered.

Certain residential meters today currently store enough energy to allow for a PON transmission. For example, a meter may store enough energy to transmit three PON messages within 30 seconds of losing main power. These PON messages may notify neighbors that the device is experiencing a power outage. The neighbors may then forward the message (s) to an outage management system that allows an electric utility to track the power outage. While experiencing a power outage, a meter does not generally perform any other communication functions (e.g. receiving, forwarding, transmitting, etc., messages other than the PON) because such activity would consume the limited energy budget of the meter. It is important to note that when a power outage occurs, a large number of spatially correlated devices within the network may be affected simultaneously. Consequently, when each affected device transmits its PON message(s), significant congestion may occur within the network due to the PON transmissions.

In a frequency-hopping network, unicast traffic is generally the dominant traffic profile when the network is in "normal" communication mode. However, when a power outage occurs, networks generally rely on broadcast communication for PON. For example, in a PON strategy for CG-Mesh, a device may split a 30-second window into three 10-second windows. Within each window, the device randomly chooses a broadcast slot and time within the broadcast slot to transmit a PON. The device transmits PONs using a broadcast slot in attempt to reach any neighboring device that still has mains power. Unfortunately, in frequency-hopping networks, the above-described PON congestion may be exacerbated by only allowing broadcast communication for a faction of time. Additionally, current testing indicates that such a PON transmission strategy does not scale well in very dense networks for the following reasons:

1) Broadcast slots only form a fraction of the channel capacity. Current networks are configured to dedicate 25% of time to broadcast and 75% of time to unicast. In normal operation, unicast traffic dominates broadcast traffic and the networks are configured accordingly.

2) Using a broadcast slot to send PONs may cause any neighboring device that still has main power to buffer and report the PON. Consequently, in a dense network, each neighbor may maintain a PON, and the network as a whole may report many duplicate messages. As a result, the memory and link utilization for the network as a whole is not efficient.

Additionally, other methods provide a mechanism that may cause devices to temporarily allocate 100% of the time to the broadcast schedule when receiving a PON. When sending PON messages, a device may restricts the first PON message to a broadcast slot, but the subsequent transmissions may be sent at any time since it may assume that neighboring devices are now listening for broadcasts 100% of the time. However, this approach has the downside that it disrupts unicast communication—neighbors that are not aware of the schedule switch will not communicate on the proper channel-hopping schedule.

Dynamically Optimizing PON Scheduling

According to the techniques herein, a power outage notification (PON) may be dynamically adjusted in a frequency-hopping network based on an observed network topology (e.g., network density, number of channels, etc.). For instance, a node/device within a frequency-hopping network may transmit PONs either inside or outside of a broadcast slot, depending upon the topology of the network with respect to number of neighbors and/or number of available channels on which to transmit. For instance, transmitting a PON within a broadcast slot may be most useful when the network density is sparse or the number of available channels is large because it ensures that all neighboring devices are listening to the same channel. On the other hand, transmitting a PON outside of a broadcast slot may be most useful when the network is dense, or available channels is small, because it allows a device to transmit PONs using a random channel at a random time. Additionally, if a hardware-based acknowledgment is available in the network, the device may utilize such feedback to better infer the density of the network, and adjust the transmission strategy for the remaining PON transmissions.

Specifically, according to one or more embodiments of the disclosure as described in detail below, the techniques herein enable a node to discover the density of neighboring nodes in a frequency-hopping communication network. The node may then identify a power outage condition, and based on the discovered density of neighboring nodes, may dynamically determine an initial power outage notification (PON) transmission protocol. The node may then communicate a first PON to a plurality of neighboring nodes according to the initial PON transmission protocol.

Illustratively, the techniques described herein may be performed by hardware, software, and/or firmware, such as in accordance with the discovery process 247, PON transmission process 248, and/or MAC layer 212 (247a/248a), which may each contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various shared-media communication that utilize frequency-hopping (channel-hopping), and as such, may be processed by similar components understood in the art that execute those protocols, accordingly.

Operationally, the techniques herein generally relate to optimizing PON transmission in a frequency-hopping network based on knowledge of the network's topology, which maximizes the reliability of communicating a PON in both sparse and dense networks when an outage occurs. According to the techniques herein, a node (e.g., a meter, sensor, etc.) within a constrained network (e.g., a LLN) may discover the number of neighboring nodes (e.g., network density) and/or the number of channels available within the network. The node may then dynamically determine, based on the discovered network density and/or number of channels, whether an initial PON should be transmitted inside of, or outside of, a broadcast slot.

As described above, during a broadcast slot, all neighboring nodes/devices may have their receivers tuned to the same channel so that any neighboring device within transmission range of the node may be able to receive the message. Because the node does not know which neighbors are also experiencing a power outage, transmitting the PON within a broadcast slot may maximize the likelihood that a neighboring node not affected by the power outage will receive the PON.

As also noted, nodes within a frequency-hopping network may establish their own unicast schedule independent of other nodes within the network. As a result, when the broadcast slot is not active, all nodes within the network are listening on generally different channels. According to the techniques herein, a node may alternatively transmit a PON outside of a broadcast slot. For instance, when transmitting outside of a broadcast slot, the node/device may still set the PON's destination address 314 to a broadcast address, while actually transmitting the message (e.g., a PON) on a random channel (or otherwise selected, e.g., a selected neighbor's schedule, the device's own schedule, etc.). If any neighboring device happens to be listening on the same channel at the same time, it will successfully receive the PON.

The probability that at least one neighbor will receive the PON when transmitting outside of a broadcast slot may illustratively be computed by the following formula:

$$P = 1 - (1 - 1/C)^N$$

where C is the number of available channels and N is the number of neighbors. One of skill in the art will appreciate that the probability of a successful PON transmission will increase as the value of C decreases and/or the value of N increases.

The number of available channels within the frequency-hopping network may be determined by localized regulatory restrictions and the particular operating mode for the link layer. For example, the number of available channels in an IEEE 802.15.4g network may vary by geographic region (e.g., in North America C=64; in Hong Kong C=11; in Brazil C=36, etc.). Generally, network density in a frequency-hopping network may vary greatly (e.g., from tens of devices to hundreds, or even thousands of devices).

A node/device may discover the number of neighbors in a variety of ways. In one embodiment, a device may simply maintain a neighbor table and count the number of messages it receives with unique source addresses within a period of time. In another embodiment, a node/device may send messages at a fixed rate, and infer the number of neighboring nodes by monitoring the received message rate. In another embodiment, a node/device may utilize the known Trickle protocol (e.g., RFC 6206) since the likelihood of suppression will increase as a function of an increasing number of neighboring nodes. By keeping track of the suppression, the node/device may infer the size of the neighborhood.

Illustratively, the probability of a successful PON transmission outside of a broadcast slot according to the techniques herein may vary with altered values of C and N as shown in the following examples:
1) P(C=64, N=10)=14.56%
2) P(C=64, N=100)=79.29%
3) P(C=64, N=1000)=99.99%
4) P(C=36, N=10)=24.55%
5) P(C=36, N=100)=94.02%
6) P(C=11, N=10)=61.45%
7) P(C=11, N=100)=99.99%

Accordingly, one of skill in the art will appreciate that there are situations in which sending a PON to a random channel outside the broadcast slot does not provide a sufficiently high probability of resulting in a successful PON transmission (e.g., higher than a probability of resulting in a successful PON transmission using the conventional broadcast window/slot techniques noted above within the given network). However, in situations where the number of neighbors is greater than a particular threshold, and/or the number of channels is lower than a particular threshold, sending a PON transmission to a random channel outside the broadcast slot may be nearly as effective as or even more effective than sending a PON transmission during a broadcast slot.

According to the techniques herein, sending a PON transmission outside of a broadcast window may provide a number of advantages. For example, by transmitting outside of a broadcast slot, nodes/devices have more available time over which to spread their PON transmissions, which may reduce the probability of collision, as well as overall network contention. Rather than being restricted to 25% of the 30 seconds available in, for example, a CG-Mesh, the devices may use the other 75% of the 30 seconds. Additionally, nodes/devices may utilize more of the available frequency spectrum because during a broadcast window, all neighboring nodes/devices will be listening on the same channel, but outside a broadcast window, neighboring nodes/devices will be listening on channels selected independently of each other. Another advantage lies in the fact that fewer neighbors will receive the outage notification, which reduces overall memory requirements for buffering, and also reduces channel utilization when neighbors forward received PON messages. Furthermore, sending PONs outside the broadcast window may reduce latency since a node/device does not need to wait for the broadcast window to become active before sending a PON.

According to the techniques herein, a node experiencing an outage condition may transmit its PON(s) (e.g., three PONs over a 30 second period) according to one of the following transmission strategies:

1) The node may transmit all PONs inside of a broadcast slot (e.g., when the network density is lower than a particular threshold and/or the number of channels is higher than a particular threshold);

2) The node may transmit all PONs outside of a broadcast slot (e.g., when the density is higher than a particular threshold and/or the number of channels is lower than a particular threshold); and 3) The node may transmit some PONs inside of a broadcast slot and others outside of a broadcast slot (e.g., a hybrid strategy comprising strategies 1 and 2).

The last strategy above represents a hybrid approach that allows a device to utilize the advantages of both strategies 1 and 2. For example, in one embodiment with X number of PON transmissions inside of a broadcast windows and Y number of PON transmissions outside of a broadcast window, the node/device may randomly select which windows to assign to the X and Y transmissions. According to the techniques herein, randomizing the window assignment may help reduce network contention and spread the use of broadcast slots over all windows. The total number of PONs (e.g., the sum of X and Y) may be based on the probability of a neighbor receiving a message outside the broadcast window, as described above.

When sending a PON messages, it is beneficial for the node/device to know the number of neighboring nodes that are not affected by the power outage. Unfortunately, because the node/device is not actively receiving messages and has a limited power budget, it is difficult if not infeasible for the node to determine how many neighboring devices are still powered. Consequently, the strategy of transmitting all PONs outside of a broadcast slot (i.e., strategy 2 above) is generally not going to be the most effective method. Accordingly, strategies 1 and 3 will be most commonly implemented by the techniques herein in a manner that varies depending upon the number of neighbors and available channels.

It is contemplated within the scope of the disclosure that the PON transmission strategy, once initiated, may be dynamically adjusted based on an acknowledgment mechanism. For example, it has been demonstrated that it is feasible to receive hardware-generated acknowledgments in response to broadcast messages (e.g., see Dutta et al. 2008, "Wireless ACK Collisions Not Considered Harmful"). While more than one (possibly many) node/device may transmit a hardware-generated acknowledgment simultaneously, they are effectively synchronized with the reception of the broadcast message and do not result in destructive interference. According to the techniques herein, an effective acknowledgment of a broadcast transmission may allow the transmitting node/device to choose the strategy for transmitting PON(x+1) based on the feedback received with respect to PON(x). For example, in a dense network, the node may choose to send the first one or two PONs outside of the broadcast window because this minimizes the chance for collisions. However, if the device does not receive any acknowledgments, the device may infer that the network density is much lower than expected, and may then choose to transmit subsequent PONs within the broadcast window. At the same time, if the device does receive an acknowledgment, it may choose to stop transmitting PONs in order to reduce network contention, memory consumption on neighboring devices, channel utilization when neighbors forward the PON messages, etc.

Figure 5:
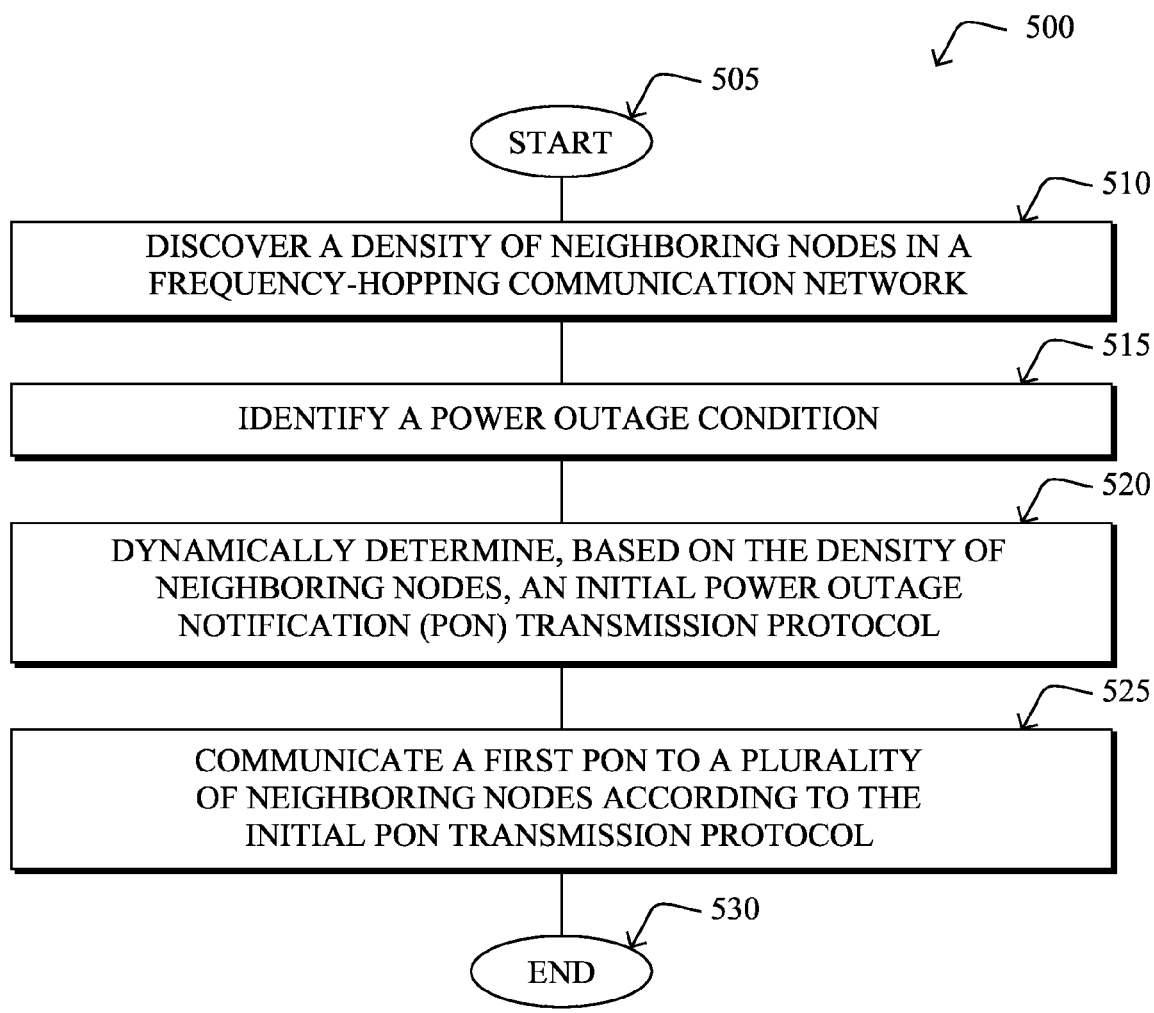
FIGS. 5-6 illustrate example simplified procedures for density-based PON scheduling in frequency-hopping networks.

FIG. 5 illustrates an example simplified procedure 500 for discovering neighboring nodes and channels within a frequency-hopping network and dynamically determining, based on the discovered neighbors and channels, and initial PON transmission strategy in accordance with one or more embodiments described herein. The procedure 500 may start at step 505, and continues to step 510, where, as described in greater detail above, a node may discover the density of neighboring nodes in a frequency-hopping communication network. As shown in step 515, the node may then identify a power outage condition, and based on the density of neighboring nodes, may dynamically determine an initial power outage notification (PON) transmission protocol as illustrated by step 520. Once determined, the node may then communicate a first PON to a plurality of neighboring nodes according to the initial PON transmission protocol as shown in step 525. The procedure 500 illustratively ends in step 530.

Figure 6:
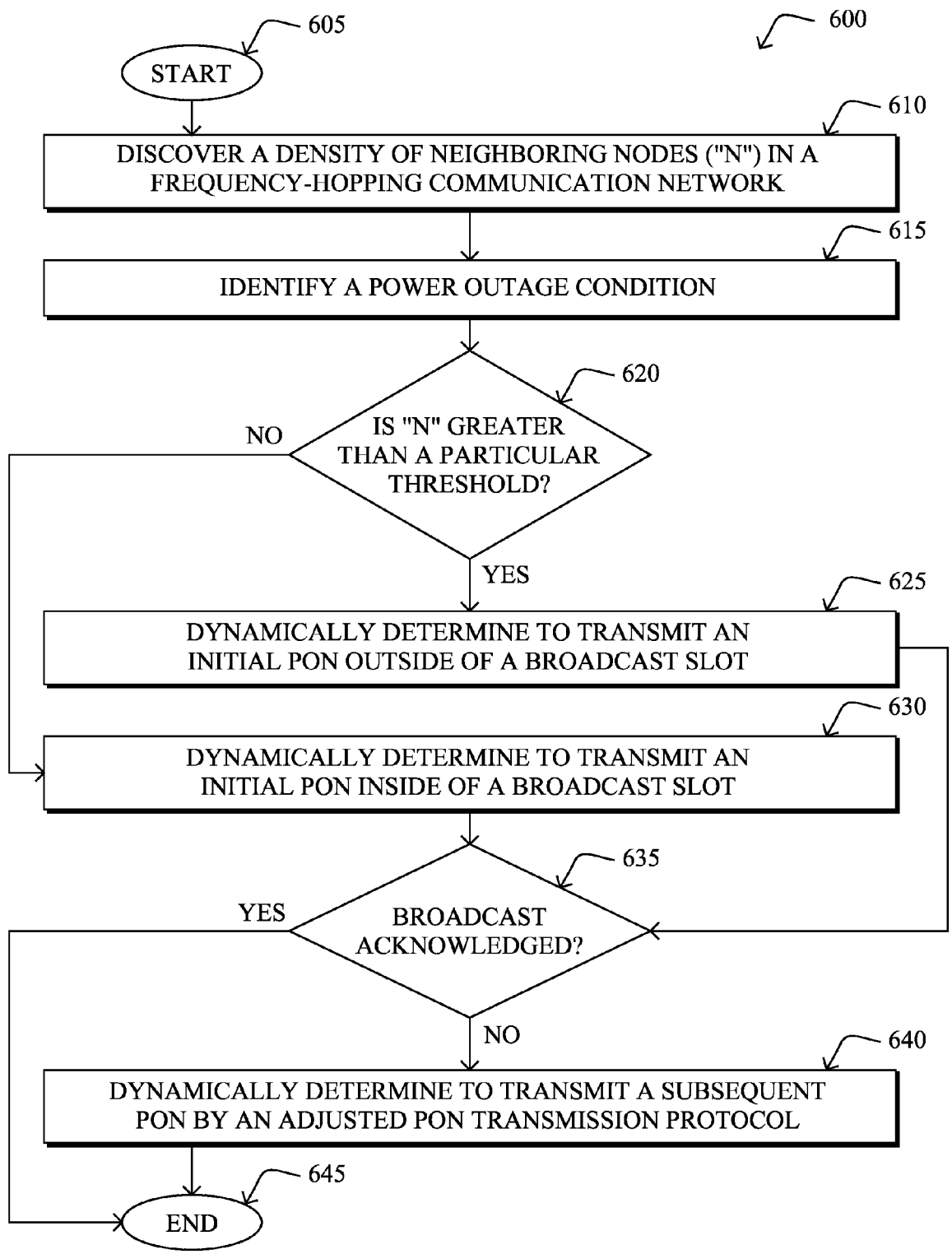

In addition, FIG. 6 illustrates another example simplified procedure 600 for discovering neighboring nodes and channels within a frequency-hopping network and dynamically determining, based on the discovered neighbors, whether an initial PON transmission strategy should be inside of, or outside of, a broadcast slot/window in accordance with one or more embodiments described herein. The procedure 600 may start at step 605, and continues to step 610, where, as described in greater detail above, a node may discover the density ("N") of neighboring nodes in a frequency-hopping communication network. As shown in step 615, the node may then identify a power outage condition. In step 620, the procedure may assess the value of "N." If the value of "N" is greater than a particular threshold, the procedure 600 may continue to step 625 and dynamically determine to transmit an initial PON outside of a broadcast slot. However, if the value of "N" is lower than a particular threshold, the procedure 600 may continue to step 630 and dynamically determine to transmit an initial PON inside of a broadcast slot. In step 635, the procedure 600 may determine whether or not an acknowledgment of the initial PON was received. If an acknowledgment was received, the procedure 600 may illustratively end at step 645. If an acknowledgement was not received, the procedure 600 may dynamically determine a subsequent PON transmission protocol as illustrated by step 640. The procedure 600 illustratively ends in step 645.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide density-based PON scheduling in frequency-hopping networks. In particular, the techniques herein maximize the reliability of communicating PONs in both sparse and dense frequency-hopping networks by allowing nodes/devices within the network to transmit PONs outside a broadcast window, which enables better utilization of the available time and channels. In dense networks, the disclosure allows for greater spectral efficiency, while reducing contention, memory consumption of devices processing PONs, and channel utilization when forwarding PONs towards the root. Compared to existing approaches, the techniques herein optimize PON transmission scheduling by dynamically adjusting to the observed network density, allowing optimal PON transmission in both sparse and dense networks. Notably, the techniques herein do not require nodes/devices to alter their frequency-hopping schedules.

While there have been shown and described illustrative embodiments that provide for density-based PON scheduling in frequency-hopping networks, it is to be understood that various other adaptations and modifications may be made within the spirit and scope of the embodiments herein. For example, the embodiments have been shown and described herein with relation to AMI networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
discovering, by a device, a density of neighboring nodes in a frequency-hopping communication network;
identifying, by the device, a power outage condition;
dynamically determining by the device and based on the density of neighboring nodes, an initial power outage notification (PON) transmission protocol by selecting whether to send a particular PON within a broadcast time slot of a frequency-hopping schedule or within a unicast time slot of the frequency-hopping schedule; and
communicating, by the device, a first PON to a plurality of neighboring nodes according to the initial PON transmission protocol.

2. The method as in claim 1, wherein the initial PON transmission protocol comprises transmitting the first PON outside of a broadcast slot when the density of neighboring nodes is greater than a particular threshold, or transmitting the first PON inside of a broadcast slot when the density of neighboring nodes is less than a particular threshold.

3. The method as in claim 1, wherein the frequency-hopping schedule comprises a number of channels.

4. The method as in claim 3, wherein the initial PON transmission protocol comprises transmitting the first PON outside of a broadcast slot when the number of channels is less than a particular threshold, or transmitting the first PON inside of a broadcast slot when the number of channels is greater than a particular threshold.

5. The method as in claim 1, further comprising:
dynamically determining, based on whether an acknowledgement of the first PON is received, an adjusted PON transmission protocol.

6. The method as in claim 5, wherein the adjusted PON transmission protocol differs from the initial PON transmission protocol if no acknowledgement is received.

7. The method as in claim 6, further comprising:
communicating one or more subsequent PONS to the plurality of neighboring nodes according to the adjusted PON transmission protocol.

8. The method as in claim 5, wherein the adjusted PON transmission protocol comprises transmitting no subsequent PON if acknowledgement is received.

9. An apparatus, comprising:
a processor;
a transceiver configured to communicate with a frequency-hopping communication network that operates according to a common broadcast slot for the network that simultaneously overlays a configured portion of all independently determined unicast listening slots in the network; and
a memory configured to store a process executable by the processor, the process when executed by the processor operable to:
discover a density of neighboring nodes in a channel-hopping communication network;
identify a power outage condition;
dynamically determine, based on the density of neighboring nodes, an initial power outage notification (PON) transmission protocol by selecting whether to send a particular PON within a broadcast time slot of a frequency-hopping schedule or within a unicast time slot of the frequency-hopping schedule; and communicate a first PON to a plurality of neighboring nodes according to the initial PON transmission protocol.

10. The apparatus as in claim 9, wherein the process when executed is further operable to:

communicate the first PON outside of a broadcast slot when the density of neighboring nodes is greater than a particular threshold, or communicate the first PON inside of a broadcast slot when the density of neighboring nodes is less than a particular threshold.

11. The apparatus as in claim 9, wherein the frequency-hopping schedule comprises a number of channels.

12. The apparatus as in claim 11, wherein the process when executed is further operable to:

communicate the first PON outside of a broadcast slot when the number of channels is less than a particular threshold, or communicate the first PON inside of a broadcast slot when the number of channels is greater than a particular threshold.

13. The apparatus as in claim 9, wherein the process when executed is further operable to:

dynamically determine, based on whether an acknowledgement of the first PON is received, an adjusted PON transmission protocol.

14. The apparatus as in claim 13, wherein the adjusted PON transmission protocol differs from the initial PON transmission protocol if no acknowledgement is received.

15. The apparatus as in claim 13, wherein the process when executed is further operable to:

communicate one or more subsequent PONS to the plurality of neighboring nodes according to the adjusted PON transmission protocol.

16. A tangible, non-transitory, computer-readable media having software encoded thereon, the software, when executed by a processor on a device in a frequency-hopping communication network that operates according to a common broadcast slot for the network that simultaneously overlays a configured portion of all independently determined unicast listening slots in the network, operable to:

discover a density of neighboring nodes in a frequency-hopping communication network;

identify a power outage condition;

dynamically determine, based on the density of neighboring nodes, an initial power outage notification (PON) transmission protocol by selecting whether to send a particular PON within a broadcast time slot of a frequency-hopping schedule or within a unicast time slot of the frequency-hopping schedule; and communicate a first PON to a plurality of neighboring nodes according to the initial PON transmission protocol.

17. The computer-readable medium as in claim 16, wherein the software when executed is further operable to:

communicate the first PON outside of a broadcast slot when the density of neighboring nodes is greater than a particular threshold, or communicate the first PON inside of a broadcast slot when the density of neighboring nodes is less than a particular threshold.

18. A method, comprising:

identifying, by a device, a power outage condition;

dynamically determining by the device and based on a probability of contacting one or more neighboring nodes when transmitting outside of a broadcast time slot, an initial power outage notification (PON) transmission protocol by selecting whether to send a particular PON within a broadcast time slot of a frequency-hopping schedule or within a unicast time slot of the frequency-hopping schedule; and communicating, by the device, a first PON to a plurality of neighboring nodes according to the initial PON transmission protocol.

19. The method as in claim 18, wherein the initial PON transmission protocol comprises transmitting the first PON outside of a broadcast slot, or transmitting the first PON inside of a broadcast slot.

20. The method as in claim 18, wherein the probability is calculated according to the following formula:

$$P=1-(1-1/C)N,$$

wherein, P is probability, C is a number of channels in the frequency-hopping network, and N is a number of neighbors in the frequency-hopping network.

\* \* \* \* \*